United States Patent [19]
Parkhurst

[11] Patent Number: 5,463,546
[45] Date of Patent: Oct. 31, 1995

[54] LODGING FACILITY AUTOMATED PROCESSING STATION

[76] Inventor: Carmenina Parkhurst, P.O. Box 969, Fortuna, Calif. 95540

[21] Appl. No.: 306,894

[22] Filed: Sep. 16, 1994

[51] Int. Cl.⁶ .................................. G06F 153/00
[52] U.S. Cl. .................... 364/407; 364/401; 340/825.28; 340/825.35
[58] Field of Search .................... 364/407, 401, 364/406; 235/381, 379; 340/825.28, 825.35, 339

[56] References Cited

U.S. PATENT DOCUMENTS

| | | | |
|---|---|---|---|
| 3,656,113 | 4/1972 | Lince | 340/825.35 |
| 4,300,040 | 11/1981 | Gould et al. | 340/825.35 |
| 4,638,312 | 1/1987 | Quinn et al. | 340/825.35 |
| 4,752,876 | 6/1988 | Couch et al. | 364/407 |
| 5,028,766 | 7/1991 | Shah | 235/381 |
| 5,091,713 | 2/1992 | Horne et al. | 340/541 |
| 5,247,160 | 9/1993 | Zicker | 235/380 |

*Primary Examiner*—David M. Huntley
*Assistant Examiner*—Frantzy Poinvil
*Attorney, Agent, or Firm*—Richard C. Litman

[57] ABSTRACT

A hotel automated processing station is placed within the outside wall in close proximity to the entrance to the main office of a hotel. In this manner, should the attendant be unavailable for a duration, the automated customer processing station could handle the customers who arrives during that duration. Alternatively, hotels or motels may be designed to be totally automated without the need of an attendant. The hotel automated processing station identifies the variety of rooms available at the time and their price per night. Further, the station has the ability to perform the monetary transaction after a particular room is chosen by the lodger. The station automatically dispenses the proper key to the lodger after the monetary transaction has been completed.

6 Claims, 3 Drawing Sheets

LODGING FACILITY AUTOMATED PROCESSING STATION

BACKGROUND OF THE INVENTION

1. FIELD OF THE INVENTION

The present invention relates to an automated processing station for a rental business. More particularly, the present invention relates to those automated processing stations for allowing a lodger to pick the desired room from those rooms available and receive a key for the picked room after paying the appropriate amount; payment could be made by cash or credit card, or a debit card.

2. DESCRIPTION OF THE PRIOR ART

Automated processing stations located on the premises of a place of business allow the user to make transactions without the need of a human attendant or clerk. It is known to provide a station for automated room rental processing, including dispensing of a key for a room.

U.S. Pat. No. 4,752,876 issued Jun. 21, 1988 to Wilfred R. Couch et. al. discloses an automated processing station for a lodging facility which includes key dispensing and receiving.

U.S. Pat. No. 5,028,766 issued Jul. 2, 1991 to Dinesh V. Shah discloses an unattended vending machine for renting video cassette tapes and players.

U.S. Pat. No. 5,247,160 issued Sep. 21, 1993 to Robert G. Zicker discloses a system for supplying a rental service provider such as a hotel or car rental service with advance printed notice of customers who are approaching the hotel or car rental service aboard a shuttle bus from a nearby airport.

None of the above inventions and patents, taken either singly or in combination, is seen to describe the instant invention as claimed.

SUMMARY OF THE INVENTION

The automated customer processing station of the present invention may be installed in any hotel, motel, inn or the like, preferably placed within the outside wall in close proximity to the entrance to the main office. Or, the station of the instant invention could be a stand alone, pedestal mounted unit. In either case, should the attendant be unavailable for a duration, the automated customer processing station could handle customers who arrives during that duration. Alternatively, hotels or motels may be designed to be totally automated without the need of an attendant. Furthermore, innkeeper employees in particular are known to indicate (usually by an exterior "Vacancy"—"No Vacancy" sign) that the facility has no vacancies, when in fact there are vacant rooms. Should the facility attendant simply not wish to deal with a potential lodger, regardless of reason, the customer may use the station of the present invention and can be assured that, if there are one or more vacant rooms, then the customer will be able to rent the same.

The automated customer processing station of the present invention is designed to allow a user to identify the variety of rooms available at the time and the price per night for each room. Further, the station has the ability to perform the monetary transaction after a particular room is chosen by the lodger. The station automatically dispenses the proper key to the lodger after the monetary transaction has been completed. The station is equipped to handle either a credit or debit card transaction, or a cash transaction. The station is designed to be fabricated of rugged materials, e.g., stainless steels and the like, so as to be wear and vandalism resistant, and may include a security alarm which sounds and/or alerts law enforcement personnel if the integrity of the station is breached in any manner. The station can also include a digital voice annunciator system or the like to guide the customer through the transaction process and even say "thank you" at the close of the transaction.

Other significant features of the instant invention include a color coordinated selection key and room availability display arrangement, and the provision of a hard copy receipt which indicates the check-in time and date, so that the customer knows the exact time the next day he or she must check out of the room. Of course, additional days could be booked and the receipt can indicate both the date and time of check-out. Furthermore, the receipt may be in two parts, one retained by the customer and the other inserted by the customer into an exposed slot on the door of the room rented so that the maid or charperson who must clean and ready the room for the next lodger knows when the present lodger is expected to vacate the room.

Of course, the station of the instant invention may be made in various sizes and configurations, to handle a wide range of inns, hostels, motels and hotels, from a small inn having only a few rooms up to a major hotel having several hundred rooms or more.

Accordingly, it is a principal object of the invention to provide an automated processing station for allowing lodgers to check-in to lodging without the need of an attendant.

It is another object of the invention to allow the user to indicate to the station the category of room sought.

It is still a further object of the invention to indicate to the user the types of categories available and the number of rooms in that category which are available.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
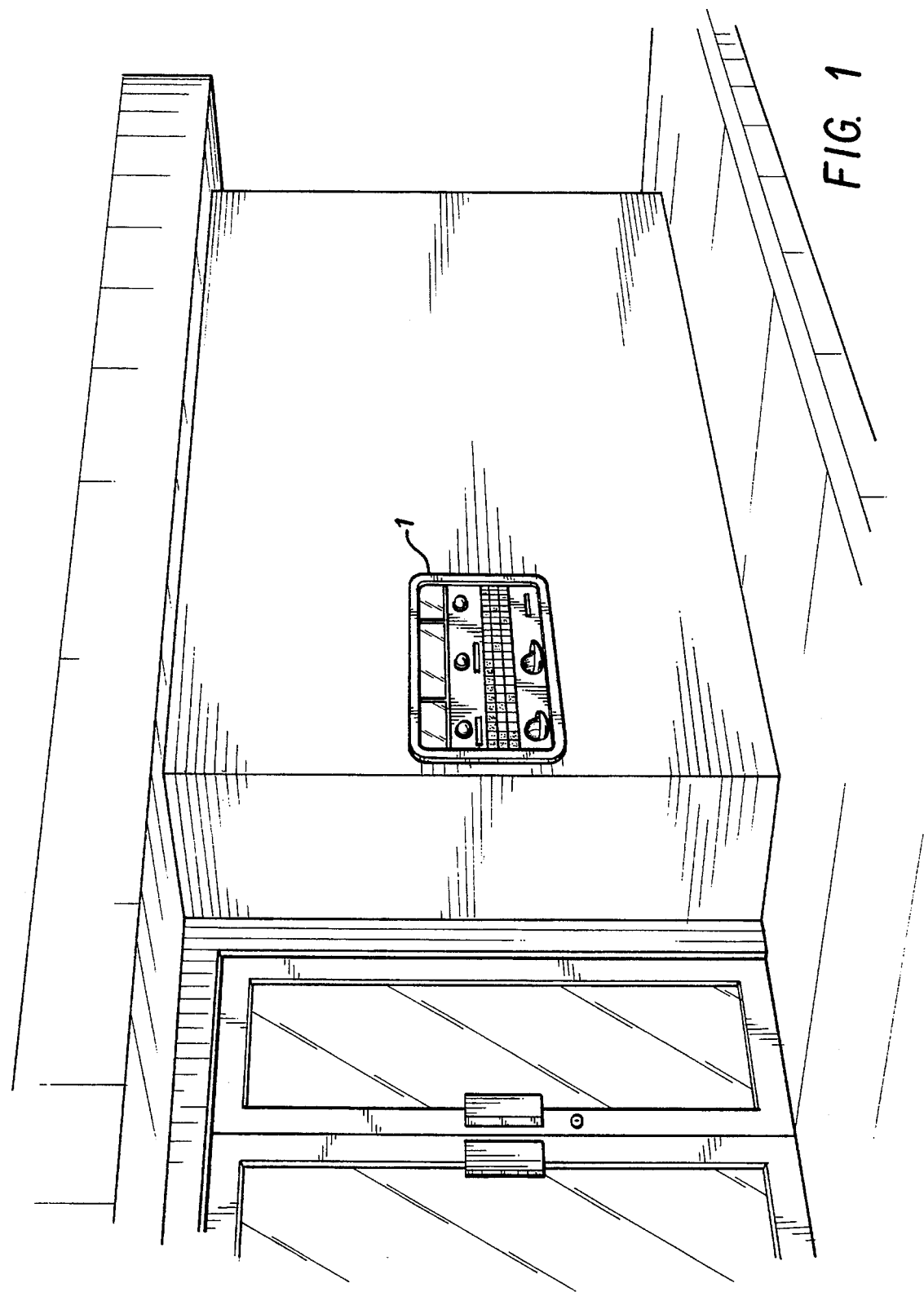
FIG. 1 is an environmental perspective view of the present invention.

As illustrated in FIG. 1, in the preferred embodiment of the present invention, the automated processing station 1 is placed outside the door to the main entrance of the front office of the hotel. If the attendant leaves, the attendant should lock the doors to the main entrance. If a potential customer comes up to the main entrance, the customer can obtain lodging quarters by using the automated processing station 1 while the attendant is away from the office.

Figure 2:
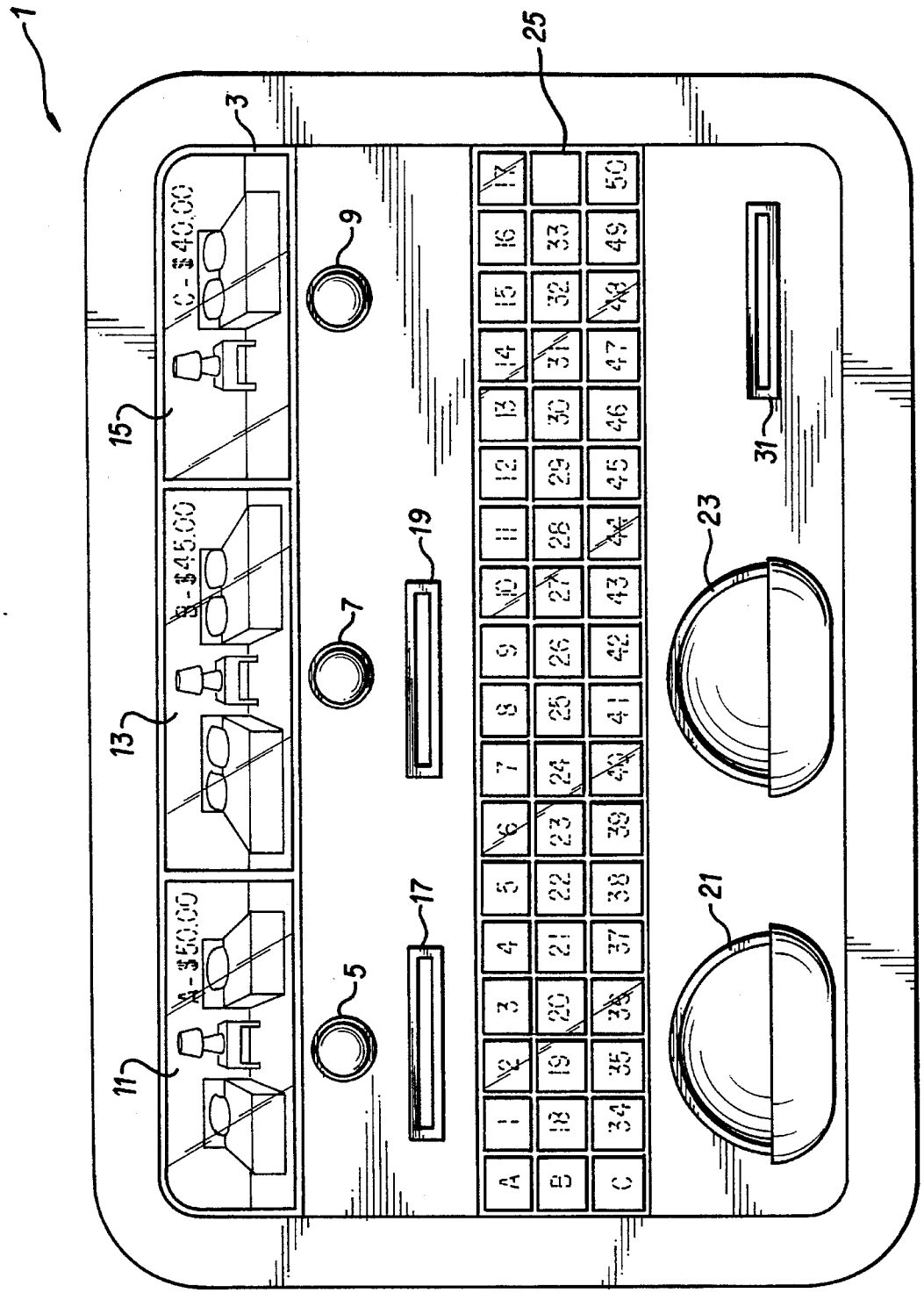
FIG. 2 is a front view of the present invention.

As illustrated in FIG. 2, the processing station 1 of the preferred embodiment includes an uncomplicated construction and is very easy to operate. A top pictorial room display 3 indicates the types of room categories offered by the hotel and the cost of each room. Three vacancy lights 5, 7 and 9 located below three pictorial room signs 11, 13, 15 of the top display, each pictorial sign showing one of the three types of lodging categories offered at the hotel, are used to indicate whether or not the type of lodging category as indicated by the sign directly above that vacancy light is available at that time. For example, lights 5, 7 and 9 could be on to indicate when the type of lodging category associated therewith is available. Alternatively, the lights 5, 7 and 9 could be turned on when no vacancy exists in the category associated therewith. Furthermore, the lights 5, 7 and 9 can be color coordinated to the background lighting of the three pictorial room display 11, 13 and 15, respectively. For example, light 5 and display 11 could be lavender, light 7 and display 13 could be green, and light 9 and display 13 could be blue. Obviously, other color schemes could be employed and those just discussed are given by way of example only.

The automated processing station 1 further includes monetary exchange units 17 and 19. In a preferred embodiment, unit 17 could be used to handle a credit or debit card transaction while unit 19 is used to handle a cash transaction. The external acceptance slots for the two different types of monetary exchange units or financial exchange media 17 and 19 are essentially similar, as shown in FIG. 2 of the drawings. At the completion of the transaction, change is returned to the lodger via change dispensing receptacle 21, and the key for the chosen room is deposited into key dispensing receptacle 23. Also, a receipt is provided through slot 31. The receipt should indicate the date and time of the transaction and should also indicate the date and time the lodger is expected to depart; the receipt may be a two part receipt separated by a line perforation, one part being a transaction record for the customer and the other being inserted into a slot provided on the door of the room rented so that the cleaning staff knows when the lodger is expected to leave so that the room may be cleaned and prepared for the next customer. Also, the key dispensed to the lodger may include a second key for the front or entrance door of the facility, if the facility is a hotel type with individual room doors located inside. Alternatively, a single key might be provided which opens both the entrance door of the facility and the door of the particular room rented or booked by the customer or lodger.

Alternatively, the system could be configured so that two people might operate the processing station at almost the same time. For example, in another embodiment the externally similar monetary exchange units 17 and 19 are automatic credit/debit card processing machines. The first person to the processing station 1, after placing his or her credit card in the first monetary exchange unit 17, begins operating keypad 25 to determine his or her selection. A second person, after placing his or her credit card in the second monetary exchange unit 19, can monitor the activities of the first person so as to know which rooms are available in each room category.

For example, if the first person is interested in the category of rooms having two single beds, the first person would press the letter "A" on the keypad 25. The keypad 25 is formed of keypad input buttons 27 and keypad light displays 29 for selectively lighting each keypad input button, see FIG. 3. Once the letter "A" is pushed, the keypad light associated therewith is lit, thereby lighting up the letter "A". Each keypad input button 27 which indicates the number of the rooms which fall into category "A" and is available is also lit. Once the first person presses the number associated with the room sought by him or her, the key for that room is dispensed by the key dispenser 23 and the credit card of the user is processed and returned by monetary exchanger 17. The light for that keypad input button is also extinguished to indicate that the room associated with that number is no longer available.

The second person can then select one of the other rooms in that category or change the category to "B" or "C" the room. Once the second person chooses a room, the credit card in the second monetary exchange unit 19 is processed and returned to the second person. Also, the key of the room selected by the second person is dispensed by the key dispenser 23.

In either of the embodiments discussed above, it is intended that the room displays 11, 13, 15, will remain lit at all times. Furthermore, it is readily apparent that the present invention provides accurate lodging information for the travelling customer and continually provides reliable information to the customer as to the availability of all of the rooms of the inn, motel or hotel. This is a great relief for travellers who, often late in the night, may seek an accommodation and will not have to rely on an innkeeper or employee who is either unavailable or unwilling to do face to face business with a late arrival.

Figure 3:
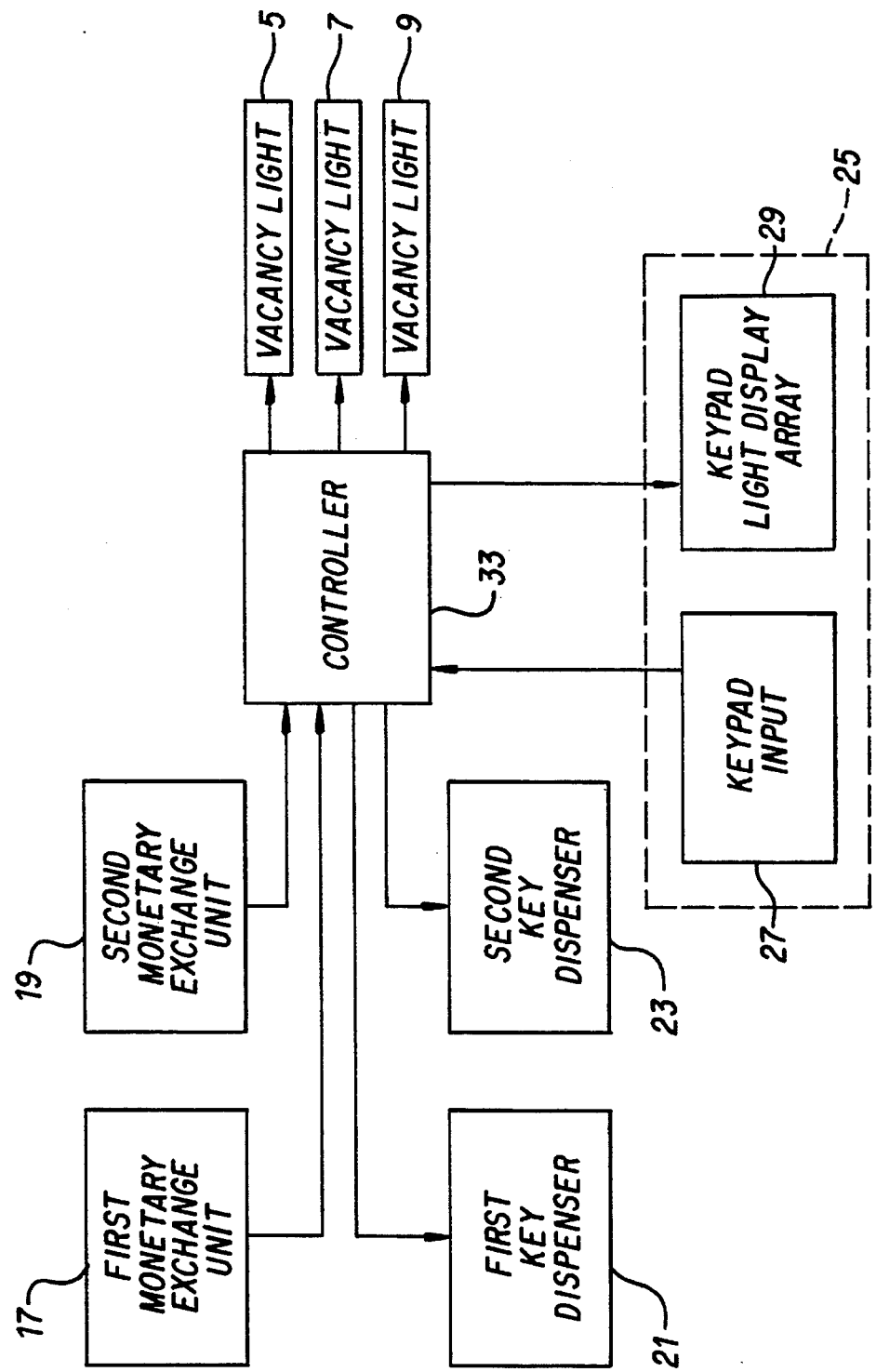
FIG. 3 is a block diagram of the present invention.

The next day as the lodgers are ready to leave, the keys to the rooms are placed in a key return slot 31. The keys to the rooms could be electronic card keys with predetermined codes located thereon to provide access to a room. FIG. 3 illustrates the control circuitry necessary to accomplish the above operations. Such operations include the storage of which rooms are available and which are not. The controller 33 preferably includes a microprocessor and all memory necessary to perform each transaction. The controller 33 may also include otherwise known voice annunciator circuitry for communicating each step and/or directions for use to the customer or lodger; a pleasant "thank you" may be announced at the end of the transaction.

It is to be understood that the present invention is not limited to the sole embodiment described above, but encompasses any and all embodiments within the scope of the following claims.

I claim:

1. A lodging facility automated processing station for use with a lodging facility having a plurality of different categories of rooms therein and with each room category defining a different room rental rate, said automated processing station including:

a pictorial room display having separate lighted displays therein of at least one representative room of each of the different categories of rooms having different rental rates, and the rental rate for each of the categories of rooms displayed;

a plurality of room category keypad pushbuttons, with each of said room category keypad pushbuttons corresponding to one of said separate lighted displays of said pictorial room display;

each of said room category keypad pushbuttons providing for the selection of one of the categories of rooms and being automatically illuminated according to the availability of the selected room category;

a plurality of individual room keypad pushbuttons, with each of said room keypad pushbuttons corresponding to one room of the lodging facility and further being divided into a plurality of groups each corresponding to one of the categories of rooms and a corresponding one of said room category keypad pushbuttons;

each of said individual room keypad pushbuttons providing for the selection of a specific room of one of the categories of rooms and being automatically illuminated according to the availability of the selected room;

monetary exchange means including at least one monetary acceptance slot, and providing for a monetary transaction to take place between said automated processing station and the user of said station, and;

key dispenser means providing for the dispensing of at least one room key according to the availability of the room selected by the user of said station by means of said room category keypad pushbuttons and said individual room keypad pushbuttons, whereby;

the user of said lodging facility automated processing station selects a room by means of said room category keypad pushbuttons and said individual room keypad pushbuttons according to the room categories and rooms indicated respectively by the illumination of said room category keypad pushbuttons and said individual room keypad pushbuttons, provides payment for the selected room by means of said monetary exchange means, and is provided with a key to the selected room by means of said key dispenser means.

2. An automated processing station as claimed in claim 1, further comprising control means for monitoring said plurality of room number keypad pushbuttons and said monetary exchange means so as to enable said key dispenser means after a proper monetary transaction is detected by said monetary exchange means.

3. An automated processing station as claimed in claim 2, wherein said monetary exchange means includes a first automatic credit/debit card processing machine and a second cash transaction processing machine.

4. An automated processing station as claimed in claim 3, wherein said key dispenser means includes a first key dispenser unit, there further being means for dispensing a hard copy receipt of the transaction.

5. An automated processing station as claimed in claim 2, wherein said monetary exchange means includes a first automatic credit card processing machine and a second automatic credit card processing machine.

6. An automated processing station as claimed in claim 1, further including:

room category vacancy indication means comprising a plurality of room category vacancy lights, with each of said room category vacancy lights corresponding to one of the categories of rooms and a corresponding one of said room category keypad pushbuttons, and being automatically illuminated according to the availability of at least one room of a corresponding one of the categories of rooms corresponding with one of said separate lighted displays of said pictorial room display and said corresponding one of said room category keypad pushbuttons.

* * * * *